(12) United States Patent
Elmaleh

(10) Patent No.: US 7,793,634 B2
(45) Date of Patent: Sep. 14, 2010

(54) ELECTRO-MAGNETIC INTERNAL COMBUSTION ENGINE

(76) Inventor: Shimon Elmaleh, 7425 SW. 109th Ter., Pinecrest, FL (US) 33156

( * ) Notice: Subject to any disclaimer, the term of this patent is extended or adjusted under 35 U.S.C. 154(b) by 216 days.

(21) Appl. No.: 12/237,792

(22) Filed: Sep. 25, 2008

(65) Prior Publication Data

US 2010/0071636 A1    Mar. 25, 2010

(51) Int. Cl.
*F02B 75/32* (2006.01)
*H02K 33/00* (2006.01)

(52) U.S. Cl. .................. 123/197.1; 310/24; 310/37
(58) Field of Classification Search .............. 123/197.1; 310/24, 37
See application file for complete search history.

(56) References Cited

U.S. PATENT DOCUMENTS

| 3,206,609 | A | * | 9/1965 | Dawes ..................... 290/1 R |
| 4,631,455 | A | * | 12/1986 | Taishoff .................. 318/37 |
| 5,397,922 | A | * | 3/1995 | Paul et al. ................ 290/1 A |
| 7,105,958 | B1 | | 9/2006 | Elmaleh |
| 2006/0130782 | A1 | * | 6/2006 | Boland .................. 123/55.2 |

* cited by examiner

*Primary Examiner*—Noah Kamen
(74) *Attorney, Agent, or Firm*—Albert Bordas, P.A.

(57) ABSTRACT

An electro-magnetic internal combustion engine having means to operate in an electro-magnetic configuration, in an internal combustion configuration, and in an electro-magnetic internal combustion combination configuration.

7 Claims, 5 Drawing Sheets

ELECTRO-MAGNETIC INTERNAL COMBUSTION ENGINE

BACKGROUND OF THE INVENTION

1. Field of the Invention

The present invention relates to engines, and more particularly, to electro-magnetic internal combustion engines.

2. Description of the Related Art

Most vehicles, and especially automobiles, comprise internal combustion engines that run exclusively on gasoline. Other vehicles run by electrical means or hybrid means. There are no engines to Applicant's knowledge that combine the unique characteristics of the present invention, mainly an electro-magnetic internal combustion engine having means to operate in an electro-magnetic configuration, in an internal combustion configuration, and in an electro-magnetic internal combustion combination configuration.

Applicant believes that one of the closest references corresponds to Applicant's own U.S. Pat. No. 7,105,958 issued on Sep. 12, 2006 for an Electro-magnetic engine. However, it differs from the present invention because in that invention Applicant taught an electro-magnetic engine and not an electro-magnetic internal combustion engine. More specifically, Applicant taught an electro-magnetic engine in which the motive force is electro-magnetism. The electro-magnetic engine comprises a housing structure, cylinder assembly, crankcase assembly, crankshaft assembly, electro-magnetism system and an electrical system. The electro-magnetism system consists of a coil assembly arranged stationary in the housing. The electro-magnetic engine includes the rotation of the crankshaft in a predetermined direction after the initial activation of the crankshaft by assembly of applying a short period of the external force, such as from an automobile starter. At least three alternators are connected to the rotating crankshaft and work at 35 amps each to recharge batteries.

SUMMARY OF THE INVENTION

The instant invention is an electro-magnetic internal combustion engine, comprising a housing structure. Cylinder means comprises at least two cylinders being encased in the housing structure and each includes a piston and a piston rod. The piston has first and second ends. The first end has a magnetic body and the second end is connected to the piston rod. Crankcase means are affixed to the housing structure. Crankshaft means are positioned in the crankcase means. The piston rod is assembled to the crankshaft means in the crankcase means.

The instant invention also comprises first means to operate in an electro-magnetic configuration with electro-magnetic means, second means to operate in an internal combustion configuration with internal combustion means; and third means to operate in an electro-magnetic internal combustion combination configuration.

The electro-magnetic means consists of coil means having at least two coils. Each of at least two coils are arranged stationary in the housing structure and are aligned with its respective piston. Each of the at least two coils have first and second openings. The first and second openings include winding terminals electrically connected to a distributor. The distributor has synchronizing means to send an electrical current to the at least two coils to switch magnetic polarity. The electro-magnetic means generate an electromotive force between the first and second openings, and its corresponding magnetic body when synchronized by the distributor. Switching the magnetic polarity between the first and second openings, forces the piston to move upward and downward within its respective cylinders, thus rotating the crankshaft means in a predetermined direction after the initial activation of the crankshaft means by applying a short period of an electrical force. The electro-magnetic means is affixed to the housing structure.

Electrical means comprise an electrical connection and a source of rechargeable battery power for supplying the rechargeable battery power for the short period of an electrical force. The electrical means further comprises the source of rechargeable battery power having the electrical connection to a starter switch. The starter switch has the electrical connection to a starter. The starter switch has the electrical connection to at least one electrical coil. The electrical coil is an inverter, and has means to convert 24 volts DC to 48, 96, and increments to 440 volts AC. The at least one electrical coil has the electrical connection to a mechanical pedal that is operated by a driver for acceleration. The mechanical pedal has the electrical connection to an electric accelerator. The mechanical pedal has the electrical connection to the computer. The computer has the electrical connection to the distributor. The short period of an electrical force derives from a starter. The magnetic body includes a permanent magnet or electro-magnet. The at least two electrical coils contain permeable material or an air core, and as the piston approaches one of the at least two electrical coils, the at least two electrical coils include the electromotive force and the induced electrical current. Induced electrical current flows through current limiters and activates transistors, and when the transistors are activated. The electrical current flows to the distributor. The electrical means comprises at least three alternators. The alternators work at 35 amps each and recharge the rechargeable battery power.

The first means to operate in the electro-magnetic configuration comprises engaging the starter switch, and the third means to operate in the electro-magnetic internal combustion combination configuration also comprises engaging the starter switch.

In the preferred embodiment, the vehicle is an automobile, truck, jeep, motorcycle, scooter, van, train, or aircraft.

It is therefore one of the main objects of the present invention to provide a vehicle having an electro-magnetic internal combustion engine, in which the motive force is electro-magnetism and internal combustion.

It is another object of the present invention to provide a vehicle having an electro-magnetic internal combustion engine with means to operate in a first electro-magnetic configuration, in a second internal combustion configuration, and in a third electro-magnetic internal combustion combination configuration.

It is yet another object of this invention to provide such an engine that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
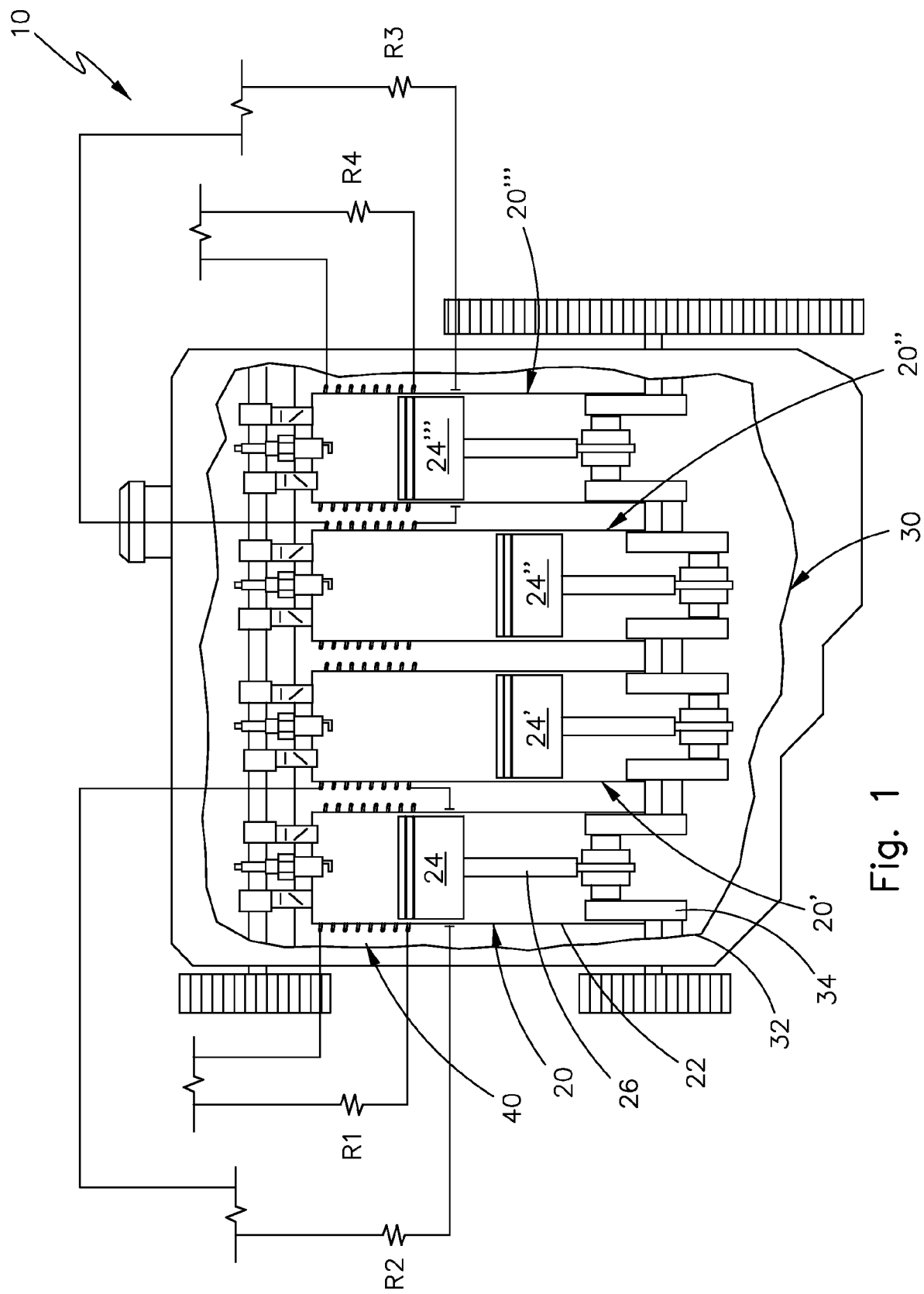
FIG. 1 is a cross-sectioned schematic view of an electromagnetic internal combustion engine to better show its internal arrangement.

Referring now to the drawings, instant invention 10 is defined as an electro-magnetic internal combustion engine. In the preferred embodiment, electro-magnetic internal combustion engine 10 consists of two or more cylinders and associated mechanisms assembled with it as described within a housing.

Figure 2:
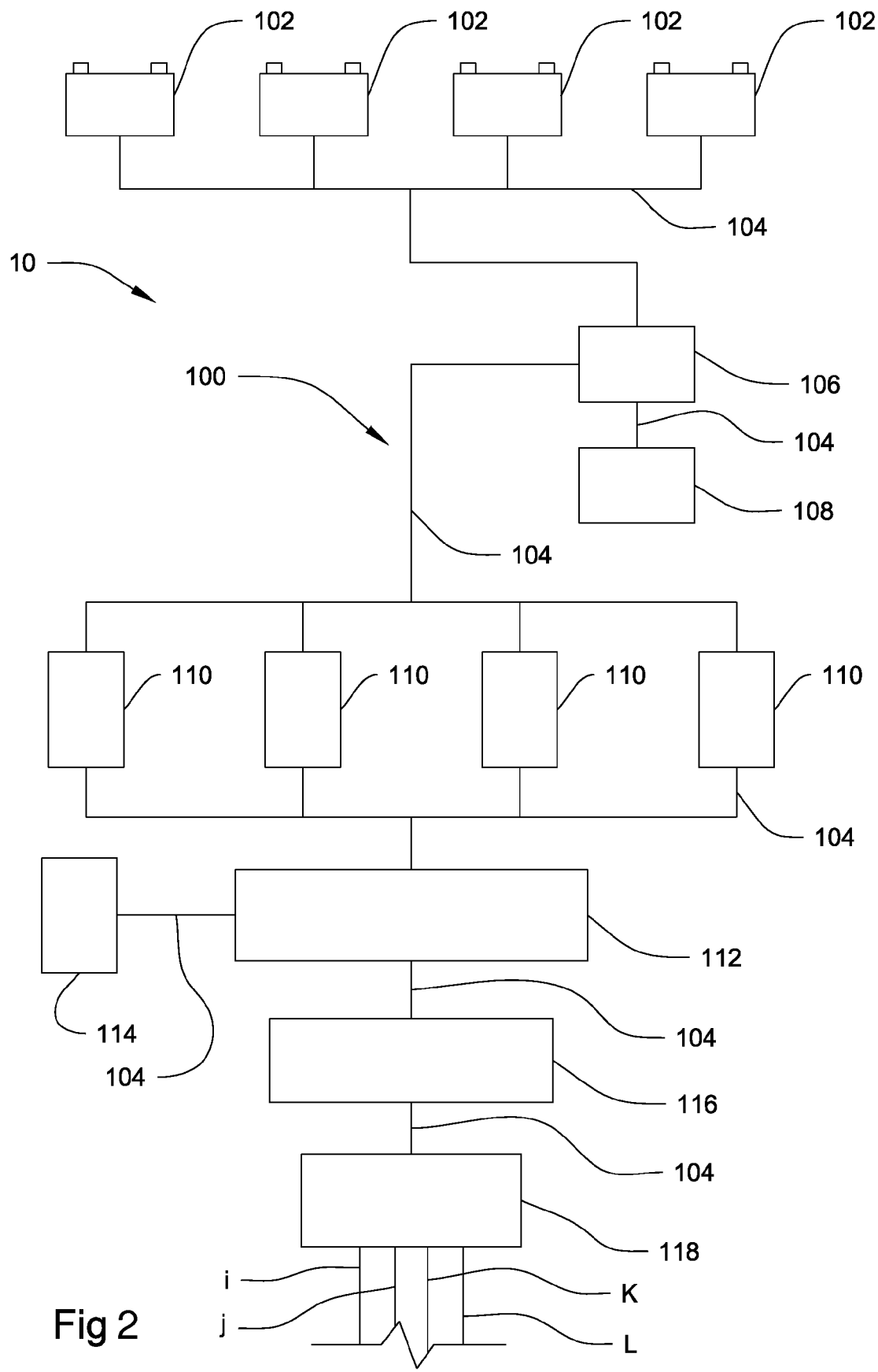
FIG. 2 is a schematic drawing showing a section of the electrical system of a four-cylinder electro-magnetic internal combustion engine.
Figure 2A:
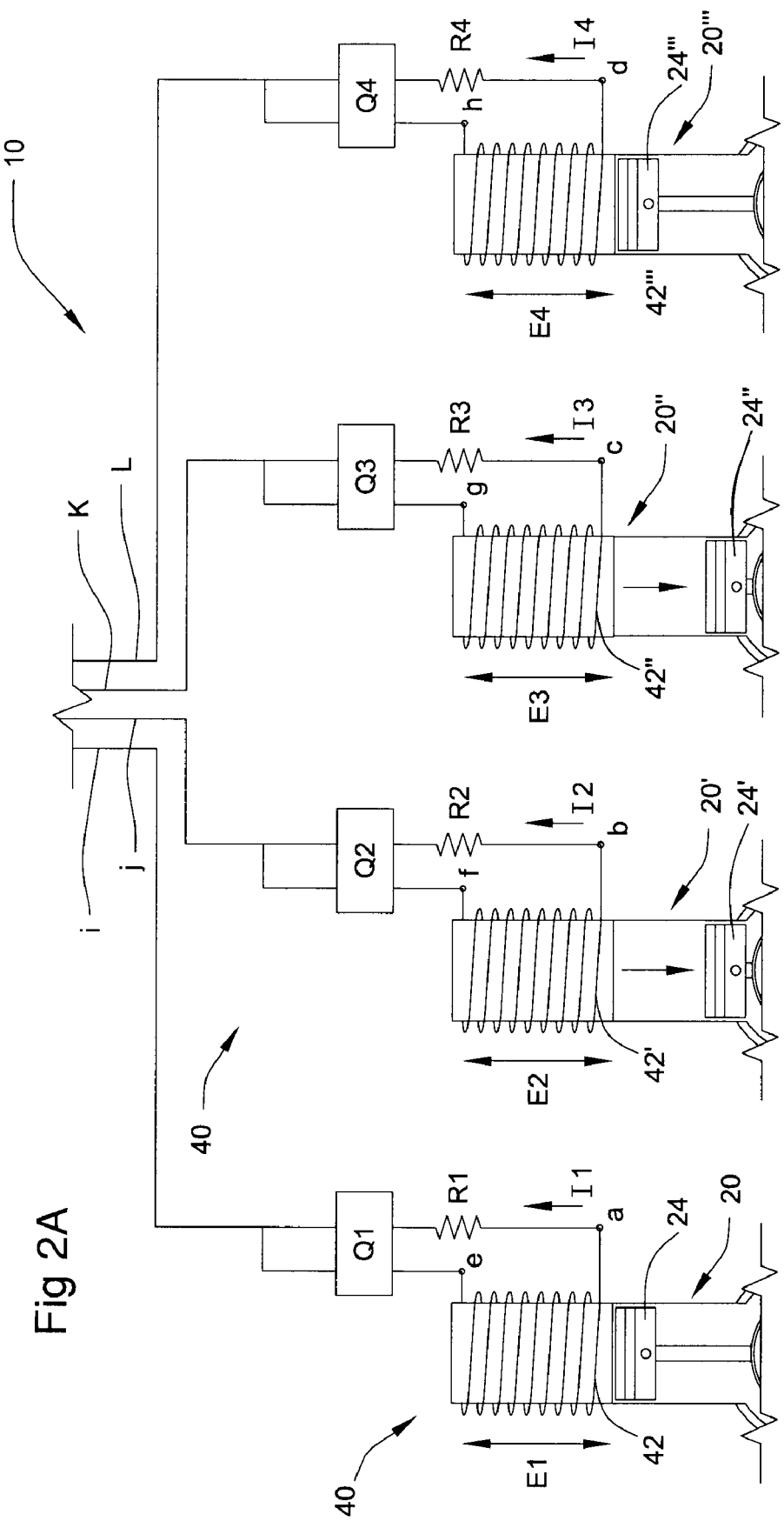
FIG. 2a is a schematic drawing showing the vertical cross section through each piston, cylinder head, and the electro-magnetism assembly of the four-cylinder electro-magnetic internal combustion engine.

As seen in FIGS. 1, 2 and 2A, it can be observed that it basically includes cylinder assemblies 20, 20', 20", 20"', crankcase assembly 30, electro-magnetism assembly 40, and electrical system 100. Cylinder assemblies 20, 20', 20", 20"' are constructed in a suitable housing means to which crankcase assembly 30 is attached. A typical piston 24, piston rod 26, and crankshaft 34 are illustrated assembled within cylinder 22 and crankcase 32.

When operating in an internal combustion configuration, electro-magnetic internal combustion engine 10 is an engine in which the combustion of fuel and an oxidizer, typically air, occurs in cylinder assemblies 20, 20', 20", 20"'. This exothermic reaction creates gases at high temperature and pressure, which are permitted to expand. It is noted that internal combustion engines are defined by the useful work that is performed by the expanding hot gases acting directly to cause the movement of solid parts of the engine. The term "internal combustion engine" is often used to refer to an engine in which combustion is intermittent, such as a Wankel engine, or a reciprocating piston engine in which there is controlled movement of pistons, cranks, cams, or rods such as the ones illustrated. Engines based on the four-stroke or Otto cycle have one power stroke for every four strokes (up-down-up-down) and are used in cars, larger boats, some motorcycles, and many light aircraft. The strokes involved are:

1) Intake stroke: Air and vaporized fuel are drawn in;
2) Compression stroke: Fuel vapor and air are compressed and ignited;
3) Combustion stroke: Fuel combusts and piston is pushed downwards; and
4) Exhaust stroke: Exhaust is driven out.

During the 1st, 2nd, and 4th stroke, the piston is relying on power and the momentum generated by the other pistons.

As seen in FIG. 2, electrical system 100 comprises rechargeable batteries 102 and electrical wires 104 that electrically connect to each of the components described below. Rechargeable batteries 102 have sufficient power to start electro-magnetic internal combustion engine 10. Each of rechargeable batteries 102 has an electrical wire 104 that connects to starter switch 106. Starter switch 106 is connected to starter 108. Starter switch 106 connects to each of electrical coils 110 with electrical wire 104. In the preferred embodiment, each of electrical coils 110, as inverters, have means to convert 24 volts to 48, 96, and increments to 440 volts. Electrical coils 110 connect to a mechanical pedal 112 that connects to an electric accelerator 114. The mechanical pedal 112 is operated by a driver whereby pressing the mechanical pedal 112 increases vehicle acceleration. Recognizing pedal placement, electric accelerator 114 communicates electronically with computer 116, and computer 116 determines current to flow to distributor 118. Extending from distributor 118 are electrical wires i, j, k, and l. It is also noted that distributor 118 has a connection, not shown, to crankshaft 34 for establishing timing. Furthermore, distributor 118 has synchronizing means to send an electrical current to coils 42, 42', 42" and 42"', seen in FIG. 2a, to switch magnetic polarity.

A typical cylinder and associated mechanisms of electro-magnetic internal combustion engine 10 is portrayed in FIG. 2a as provided. As seen in this illustration, when operating in an electro-magnetic configuration, electro-magnetic internal combustion engine 10 has cylinder assemblies 20 and 20"' and their respective pistons 24 and 24"' in the position of approximately top dead center and cylinder assemblies 20' and 20" and their respective pistons 24' and 24" in the position of approximately bottom dead center.

In the illustrated embodiment, the electro-magnetism assembly 40 comprises coils 42, 42', 42" and 42"' for pistons 24, 24', 24" and 24"' respectively. Coils 42, 42', 42" and 42"' are stationary and are positioned in an aligned manner with cylinder assemblies 20, 20', 20", and 20"' respectively. As shown in this figure, four winding terminals a, b, c, and d are located respectively at the opening of coils 42, 42', 42" and 42"' respectively, and the other four winding terminals e, f, g and h are located at the other opening of each coil 42, 42', 42" and 42"' respectively.

In the illustrated four-cylinder electro-magnetic internal combustion engine, pistons 24 and 24"' have completed their respective travel in the upward direction to the position of approximately top dead center within cylinder assemblies 20 and 20"' respectively. As pistons 24 and 24"' approach the end of coils 42 and 42"' respectively, as seen in this illustration, coils 42 and 42"' induce electromotive forces E1 and E4 and induce currents I1 and I4 respectively.

The induced currents I1 and I4 flow through their respective current limiters R1 and R4 and activate transistors Q1 and Q4 respectively. When the transistors Q1 and Q4 are activated, the currents I1 and I4 flow to distributor 118. Distributor 118 synchronizes the generation of opposite forces by sending an electrical current to switch magnetic polarity to coils 42 and 42"' (i.e., an opposite electromotive force) so as to force the pistons 24 and 24"' respectively moving upward and downward.

Similarly, electromotive forces E2 and E3 can also be induced with coils 42' and 42" by pistons 24' and 24" that induce currents I2 and I3 respectively. The induced currents I2 and I3 flow through their respective current limiters R2 and R3 and activate transistors Q2 and Q3 respectively. When the transistors Q2 and Q3 are activated, the currents I2 and I3 flow to distributor 118. Distributor 118 synchronizes the generation of opposite forces by sending an electrical current to switch magnetic polarity to coils 42' and 42" (i.e., an opposite electromotive force) so as to force the pistons 24' and 24" respectively moving upward and downward.

Forcing pistons 24, 24', 24" and 24'" upward and downward within their respective cylinder assemblies 20, 20', 20", 20'", rotates crankshaft 34, seen in FIGS. 3-6, in a predetermined direction after the initial activation of the crankshaft 34. Initial activation of the crankshaft 34 can be accomplished by means of applying a short period of the force, such as from starter 108. Similarly, the piston is relying on power and the momentum generated by the other pistons. At least three alternators, not shown, are connected to the rotating crankshaft 34. In the preferred embodiment, the alternators work at 35 amps each and recharge rechargeable batteries 102.

Figure 3:
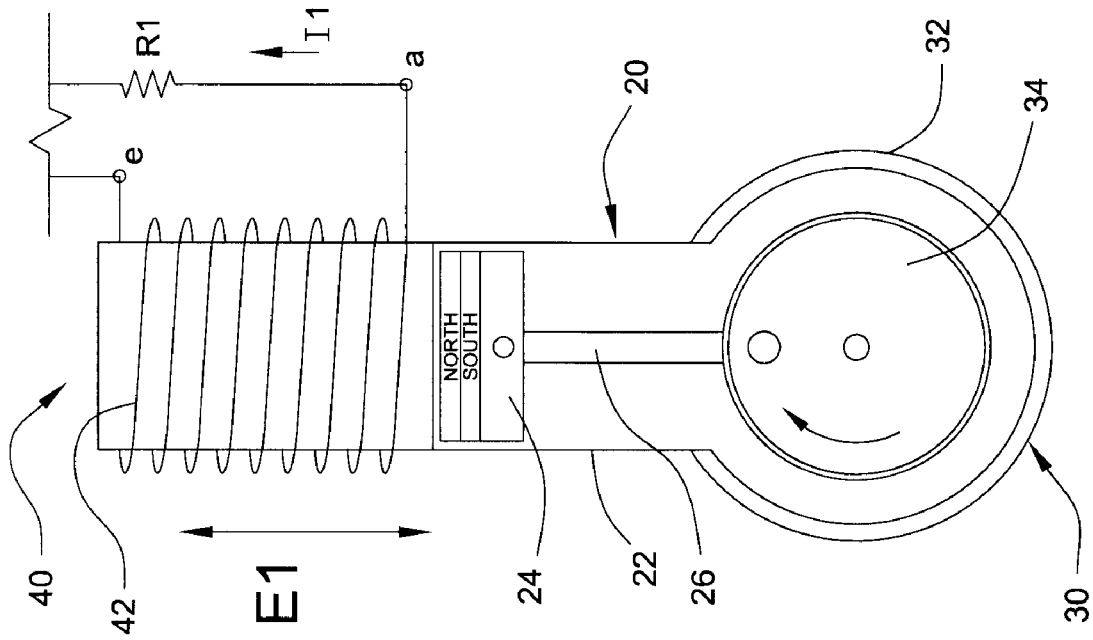
FIG. 3 is a schematic drawing showing a vertical cross section through the crankshaft, piston, cylinder head, and electro-magnetism assembly of the electro-magnetic internal combustion engine on an upward stroke.

FIG. 3 illustrates piston 24 traveling in an upward direction. It is noted that piston 24 comprises a magnetic body having a permanent magnetic material defining a north and a south polarity as illustrated. Each of the magnetic bodies, in other pistons, has a same direction of a polarity. The direction of rotation of crankshaft 34 is shown in each of FIGS. 4 through 6. As shown in FIG. 3, piston 24 is attracted to coil 42.

Figure 4:
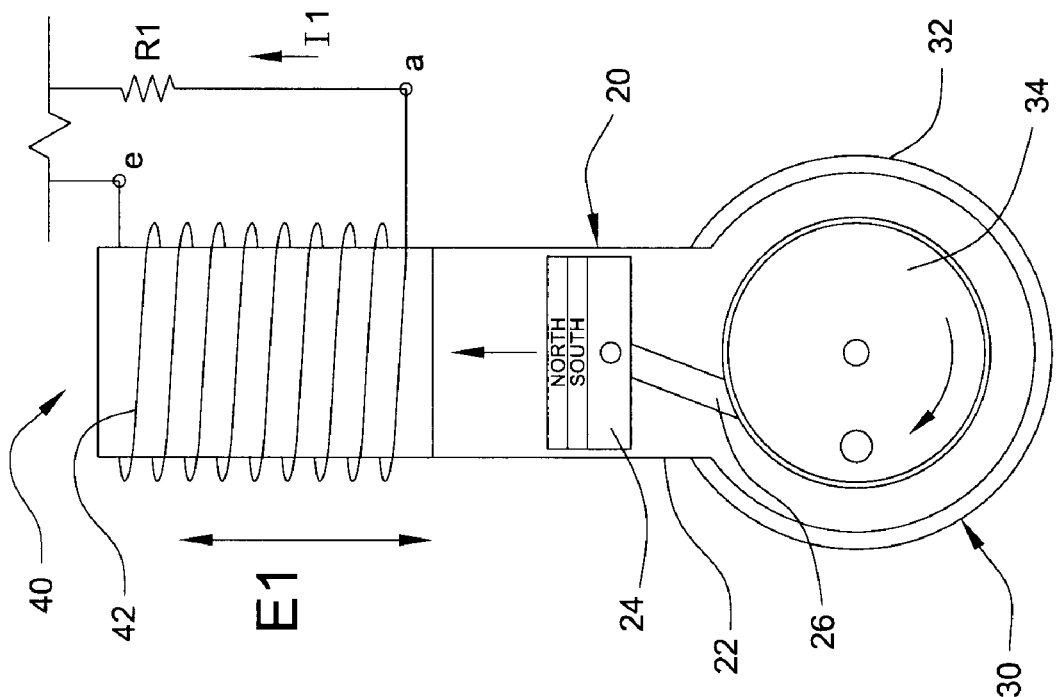
FIG. 4 is a schematic drawing showing the vertical cross section through the crankshaft, piston, cylinder head, and electro-magnetism assembly of the electro-magnetic internal combustion engine on the upward stroke at approximately top dead center.

As seen in FIG. 4 in cylinder assembly 20, piston 24 completed its travel in the upward direction to the position of approximately top dead center. When piston 24 approaches the end of coil 42, as seen in this illustration, coil 42 induces an electromotive force E1.

Figure 5:
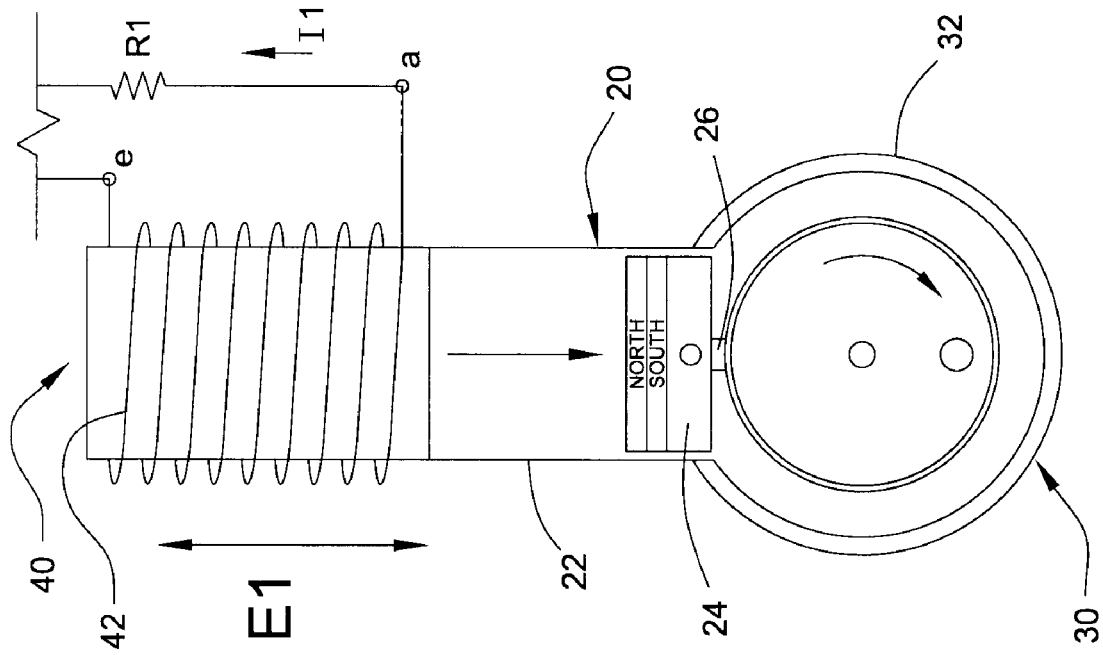
FIG. 5 is a schematic drawing showing the vertical cross section through the crankshaft, piston, cylinder head, and electro-magnetism assembly of the electro-magnetic internal combustion engine on a downward stroke.

FIG. 5 illustrates piston 24 traveling in a downward direction in cylinder 22. As shown in this illustration, piston 24 is repelling from coil 42.

Figure 6:
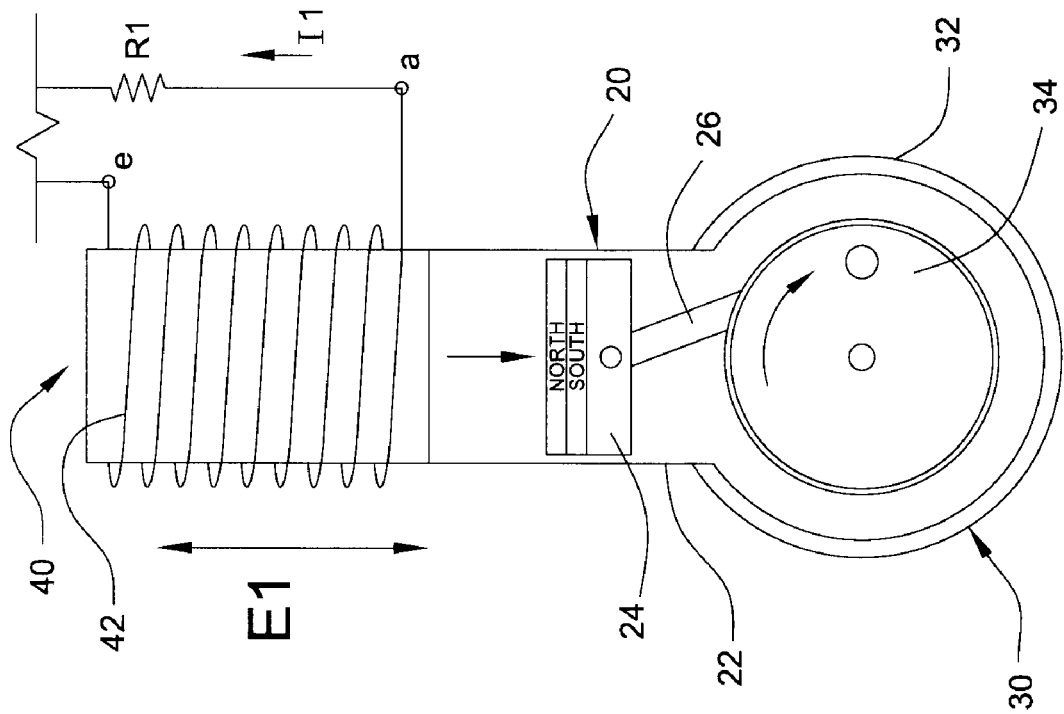
FIG. 6 is a schematic drawing showing the vertical cross section through the crankshaft, piston, cylinder head, and electro-magnetism assembly of the electro-magnetic internal combustion engine on the downward stroke at approximately bottom dead center.

As seen in FIG. 6, piston 24 continues to travel in the downward direction to the position of approximately bottom dead center.

It is noted that when operating exclusively in an electro-magnetic configuration, pistons 24, 24', 24" and 24'" can move upwardly and downwardly within their respective cylinder assemblies 20, 20', 20", 20'" multiple times depending on the electrical currents to switch magnetic polarities to the coils to rotate crankshaft 34.

It is noted that the electro-magnetic internal combustion engine 10 has means to operate in an electro-magnetic configuration, in an internal combustion configuration, and in an electro-magnetic internal combustion combination configuration. Such means can include, but is not limited to, starter switch 106, whereby it is engaged to operate instant invention 10 in the electro-magnetic configuration or in the electro-magnetic internal combustion combination configuration, and would not be engaged to operate instant invention 10 in the internal combustion configuration.

Electro-magnetic internal combustion engine 10 also comprises a water-pump system for cooling coils 42, 42', 42" and 42'" and an engine oil system for lubrication and cooling that have not been illustrated for simplification. In addition, it is noted that electro-magnetic internal combustion engine 10 is manufactured of demagnetized material. Furthermore, it is noted that cylinder assembly layout may change, wherein it may also be a rotary type engine. In addition, alternators and/or generators may be rotatably mounted onto a shaft extending from crankshaft 34 to produce power for the source of rechargeable battery power. Furthermore, permanent magnets may be mounted around coils 42, 42', 42" and 42'" to be used as alternators.

This invention is suitable to be used for vehicles such as, but not limited to, automobiles, trucks, jeeps, motorcycles, scooters, vans, trains, and aircraft.

With regard to electro-magnetic internal combustion engine 10, traditional components such as timing chains, gears etc. have not been depicted. It is understood that these components will be part of the final embodiment. The electro-magnetic internal combustion engine 10 may consist of two or more cylinders and necessary mechanisms constructed of suitable materials as described in this invention, and can also be of a diesel or fuel injection model. Only a portion of the mechanism means has been illustrated enough to describe the invention, it is to be understood that variation in these elements of structure to obtain the same results is within the scope of the invention. In addition, it is important to note that electro-magnetic internal combustion engine 10 requires scheduled maintenance and replacement of electro-magnetism assembly 40 at predetermined time intervals to maintain predetermined electromotive forces to properly operate.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electro-magnetic internal combustion engine, comprising:
    A) a housing structure;
    B) cylinder means, said cylinder means comprising at least two cylinders being encased in said housing structure and each including a piston and a piston rod, said piston having first and second ends, said first end having a magnetic body and said second end connected to said piston rod;
    C) crankcase means, said crankcase means being affixed to said housing structure;
    D) crankshaft means, said crankshaft means being positioned in said crankcase means, said piston rod being assembled to said crankshaft means in said crankcase means;
    E) first means to operate in an electro-magnetic configuration with electro-magnetic means, said electro-magnetic means consists of coil means having at least two coils, each of at least two coils arranged stationary in said housing structure aligned with its respective said piston, each of at least two coils having first and second openings, said first and second openings include winding terminals electrically connected to a distributor, said distributor having synchronizing means to send an electrical current to said at least two coils to switch magnetic polarity, said electro-magnetic means generate an electromotive force between said first and second openings, and its corresponding said magnetic body when synchronized by said distributor, wherein switching said magnetic polarity between said first and second openings forces said piston to move upward and downward within its respective said at least two cylinders thus rotating said crankshaft means in a predetermined direction after the initial activation of said crankshaft means by applying a short period of an electrical force, said electro-magnetic means being affixed to said housing structure;
    F) second means to operate in an internal combustion configuration with internal combustion means; and
    G) electrical means comprising an electrical connection and a source of rechargeable battery power for supplying said rechargeable battery power for said short period of an electrical force, said electrical means further comprises said source of rechargeable battery power having said electrical connection to a starter switch, said starter switch has said electrical connection to a starter, said starter switch has said electrical connection to at least one electrical coil, said electrical coil is an inverter, and has means to convert 24 volts DC to 48, 96, and increments to 440 volts AC, said at least one electrical coil has said electrical connection to a mechanical pedal that is operated by a driver for acceleration, said mechanical pedal has said electrical connection to an electric accelerator, said mechanical pedal has said electrical connection to said computer, said computer has said electrical connection to said distributor, said short period of an electrical force derives from a starter, said magnetic body includes a permanent magnet or electro-magnet, said at least two electrical coils contain permeable material or an air core, and as said piston approaches one of said at least two electrical coils, said at least two electrical coils include said electromotive force and said induced electrical current, induced said electrical current flows through current limiters and activates transistors, and when said transistors are activated, said electrical current flows to said distributor, said electrical means comprising at least three alternators, said alternators work at 35 amps each and recharge said rechargeable battery power.

2. The electro-magnetic internal combustion engine set forth in claim 1, further characterized in that said first means to operate in said electro-magnetic configuration comprises engaging said starter switch.

3. The electro-magnetic internal combustion engine set forth in claim 1, further comprising third means to operate in an electro-magnetic internal combustion combination configuration with said electro-magnetic means and said internal combustion means.

4. The electro-magnetic internal combustion engine set forth in claim 3, further characterized in that said third means to operate in said electro-magnetic internal combustion combination configuration comprises engaging said starter switch.

5. An electro-magnetic internal combustion engine, comprising:
A) a housing structure;
B) cylinder means, said cylinder means comprising at least two cylinders being encased in said housing structure and each including a piston and a piston rod, said piston having first and second ends, said first end having a magnetic body and said second end connected to said piston rod;
C) crankcase means, said crankcase means being affixed to said housing structure;
D) crankshaft means, said crankshaft means being positioned in said crankcase means, said piston rod being assembled to said crankshaft means in said crankcase means;
E) first means to operate in an electro-magnetic configuration with electro-magnetic means, said electro-magnetic means consists of coil means having at least two coils, each of at least two coils arranged stationary in said housing structure aligned with its respective said piston, each of at least two coils having first and second openings, said first and second openings include winding terminals electrically connected to a distributor, said distributor having synchronizing means to send an electrical current to said at least two coils to switch magnetic polarity, said electro-magnetic means generate an electromotive force between said first and second openings, and its corresponding said magnetic body when synchronized by said distributor, wherein switching said magnetic polarity between said first and second openings forces said piston to move upward and downward within its respective said at least two cylinders thus rotating said crankshaft means in a predetermined direction after the initial activation of said crankshaft means by applying a short period of an electrical force, said electro-magnetic means being affixed to said housing structure;
F) second means to operate in an internal combustion configuration with internal combustion means;
G) third means to operate in an electro-magnetic internal combustion combination configuration with said electro-magnetic means and said internal combustion means; and
H) electrical means comprising an electrical connection and a source of rechargeable battery power for supplying said rechargeable battery power for said short period of an electrical force, said electrical means further comprises said source of rechargeable battery power having said electrical connection to a starter switch, said starter switch has said electrical connection to a starter, said starter switch has said electrical connection to at least one electrical coil, said electrical coil is an inverter, and has means to convert 24 volts DC to 48, 96, and increments to 440 volts AC, said at least one electrical coil has said electrical connection to a mechanical pedal that is operated by a driver for acceleration, said mechanical pedal has said electrical connection to an electric accelerator, said mechanical pedal has said electrical connection to said computer, said computer has said electrical connection to said distributor, said short period of an electrical force derives from a starter, said magnetic body includes a permanent magnet or electro-magnet, said at least two electrical coils contain permeable material or an air core, and as said piston approaches one of said at least two electrical coils, said at least two electrical coils include said electromotive force and said induced electrical current, induced said electrical current flows through current limiters and activates transistors, and when said transistors are activated, said electrical current flows to said distributor, said electrical means comprising at least three alternators, said alternators work at 35 amps each and recharge said rechargeable battery power.

6. The electro-magnetic internal combustion engine set forth in claim 5, further characterized in that said first means to operate in said electro-magnetic configuration comprises engaging said starter switch.

7. The electro-magnetic internal combustion engine set forth in claim 6, further characterized in that said third means to operate in said electro-magnetic internal combustion combination configuration comprises engaging said starter switch.

* * * * *